United States Patent [19]

Norris et al.

[11] Patent Number: 4,502,347
[45] Date of Patent: Mar. 5, 1985

[54] ROBOTIC WRIST

[75] Inventors: George W. Norris, Wilkins Township, Allegheny County; Richard M. Kobuck, Delmont; William J. Varley, Export; Arthur F. Jacobs, Monroeville; Herbert E. Ferree, Hempfield Township, Westmoreland County, all of Pa.

[73] Assignee: Westinghouse Electric Corp., Pittsburgh, Pa.

[21] Appl. No.: 420,669

[22] Filed: Sep. 21, 1982

[51] Int. Cl.³ .................................... F16H 1/20
[52] U.S. Cl. ................................ 74/447; 74/665 F; 414/4
[58] Field of Search ............ 74/665 H, 665 S, 665 T, 74/665 K, 665 B, 665 F, 660, 417, 469; 414/4, 5, 6, 729, 735, 738

[56] References Cited

U.S. PATENT DOCUMENTS

| 2,106,937 | 2/1938 | Torbert, Jr. | 74/417 X |
| 2,235,427 | 3/1941 | Harris | 74/417 X |
| 2,291,729 | 8/1942 | Koett | 74/417 X |
| 2,348,266 | 5/1944 | Selby | 74/417 |
| 3,739,923 | 6/1973 | Totsuka | 414/735 |
| 3,784,031 | 1/1974 | Niitu et al. | 414/735 |
| 3,922,930 | 12/1975 | Fletcher et al. | 74/665 B |
| 3,985,238 | 10/1976 | Nakura et al. | 74/417 X |
| 4,047,448 | 9/1977 | Pardo et al. | 74/417 |
| 4,062,455 | 12/1977 | Flatau | 414/4 X |
| 4,068,536 | 1/1978 | Stackhouse | 74/417 |
| 4,260,940 | 4/1981 | Engelberger et al. | 414/5 X |
| 4,358,243 | 11/1982 | Heath | 74/417 X |

FOREIGN PATENT DOCUMENTS 598749 3/1978 U.S.S.R. ............................ 414/735

Primary Examiner—Leslie A. Braun
Assistant Examiner—Dwight G. Diehl
Attorney, Agent, or Firm—E. C. Arenz

[57] ABSTRACT

A robotic manipulator wrist has one part 10 rotatable relative to the other part 12 of the wrist, and gear trains 16, 18, 20, operates to rotate the end effector shaft 14 when a brake 36 is applied to prevent relative movement between the two parts 10 and 12, and to rotate one part 10 relative to the other part 12 when a second brake 38 is applied to prevent relative movement between the end effector gear 18 and the intermediate gear 16.

9 Claims, 4 Drawing Figures

ROBOTIC WRIST

BACKGROUND OF THE INVENTION

This invention pertains to the art of robotic wrists capable of orienting an end effector on the wrist in many dispositions in accordance with the action of the wrist.

Wrists of this general type and having such capabilities are well known as evidenced by those disclosed in U.S. Pat. Nos. 4,068,536; 3,922,930; and 3,739,923, for example.

The aim of this invention is to provide a multiaxis wrist capable of effecting rotation of one part of the wrist relative to another part, as well as rotation of the end effector through the use of a single gear train means.

SUMMARY OF THE INVENTION

In accordance with the invention, the wrist is of the type in which one part carries an end effector rotatable about its own axis, the one part of the wrist being rotatable relative to the other part of the wrist about another axis, and gear train means is provided for effecting selectively rotation of the one part relative to the other part and, alternatively, rotation of the end effector about its axis. The gear train means includes a first gear in the wrist disposed with its axis of rotation coincident with the said another axis, this first gear means being mounted in rotatable relation to the one part of the wrist, and second gear means affixed for rotation with the end effector and in meshing relation with the first gear means, and a third gear in meshing relation with the first gear and driven from a remote source. Brake means is provided to prevent relative movement between the one part and the other part of the wrist to obtain end effector rotation alone through the gear train means operation, and for alternatively preventing relative movement between the first and second gears to obtain movement of the one part of the wrist relative to the other part of the wrist through the same gear train means operation.

DRAWING DESCRIPTION

DESCRIPTION OF THE PREFERRED EMBODIMENT

Figure 2:
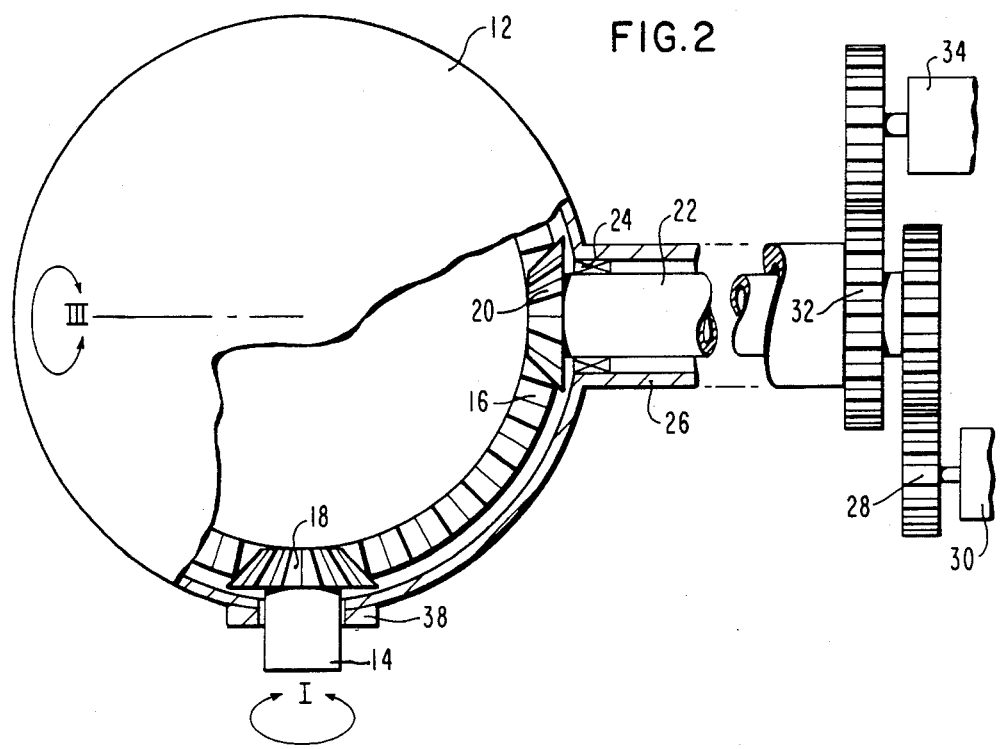
FIG. 2 is a plan view of the wrist of FIG. 1, also mainly schematic for the same purpose.
Figure 1:
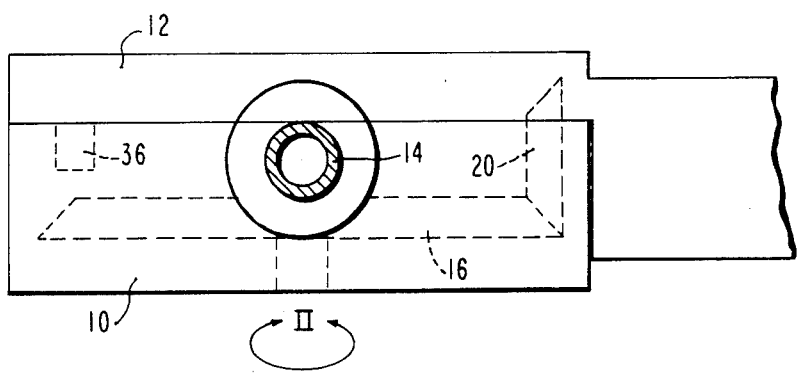
FIG. 1 is an elevation view, mainly in schematic form, illustrating the concept of the invention.

Referring to FIGS. 1 and 2, the generally schematic representations of one form of wrist are intended for explaining the concept of the invention.

The wrist comprises one part 10 which is rotatable about axis II relative to the other part 12 of the wrist. The one part 10 carries an end effector shaft 14 which is translationally fixed to the one part, but is rotatable relative to part 10 about the end effector axis I seen in FIG. 2.

Gear train means is provided for effecting selectively rotation of the one part 10 of the wrist relative to the other part 12 of the wrist, and alternatively rotation of the end effector shaft 14 about its axis. The gear train includes first gear means in the form of a bevel gear 16, second gear means in the form of a bevel gear 18 affixed to the end effector 14 for rotation thereof, and third gear means 20 shown in the form in FIGS. 1 and 2 as what may be considered a pinion gear. Both the pinion gear 20 and end effector gear 18 are in meshing relation with the bevel gear 16.

The pinion gear 20 is affixed to the end of tube 22 which is rotatably mounted, as by bearings 24, within a concentrically outer torque tube 26. Pinion gear 20 is rotated simultaneously with rotation of the tube 22, which in turn may be powered by any suitable means such as the spur gear set 28 driven by motor 30. Outer torque tube 26 is suitably supported by means not shown and may be caused to rotate through another spur gear set 32 driven by motor 34. Rotation of tube 26 of course results in rotation of the entire wrist and all of its components about an axis III.

In accordance with the invention, brake means are provided and are selectively engaged to obtain either the rotation of the one part 10 relative to the other part 12, or rotation of the end effector shaft 14 alone, through the operation of the single gear train comprising gear 16, 18 and 20. One brake means 36 functions, when engaged, to prevent relative movement between the one part 10 and the other part 12 of the wrist. The other brake means 38 functions, when engaged, to prevent relative movement between the first and second gears 16 and 18. If brake 36 is engaged with brake 38 disengaged, rotation of the pinion gear 20 causes rotation of the bevel gear 16 relative to the housing and accordingly, causes rotation of end effector gear 18 and the end effector. If, alternatively, brake 36 is disengaged while brake 38 is engaged to clamp the end effector and thus prevent its rotation, then rotation of the pinion gear will cause rotation of the bevel gear 16 which, in effect, is now tied to part 10 of the wrist through the locked relationship of the end effector gear 18 and the bevel gear 16. Thus, the one part 10 of the wrist rotates relative to the other part 12 of the wrist.

Figure 3:
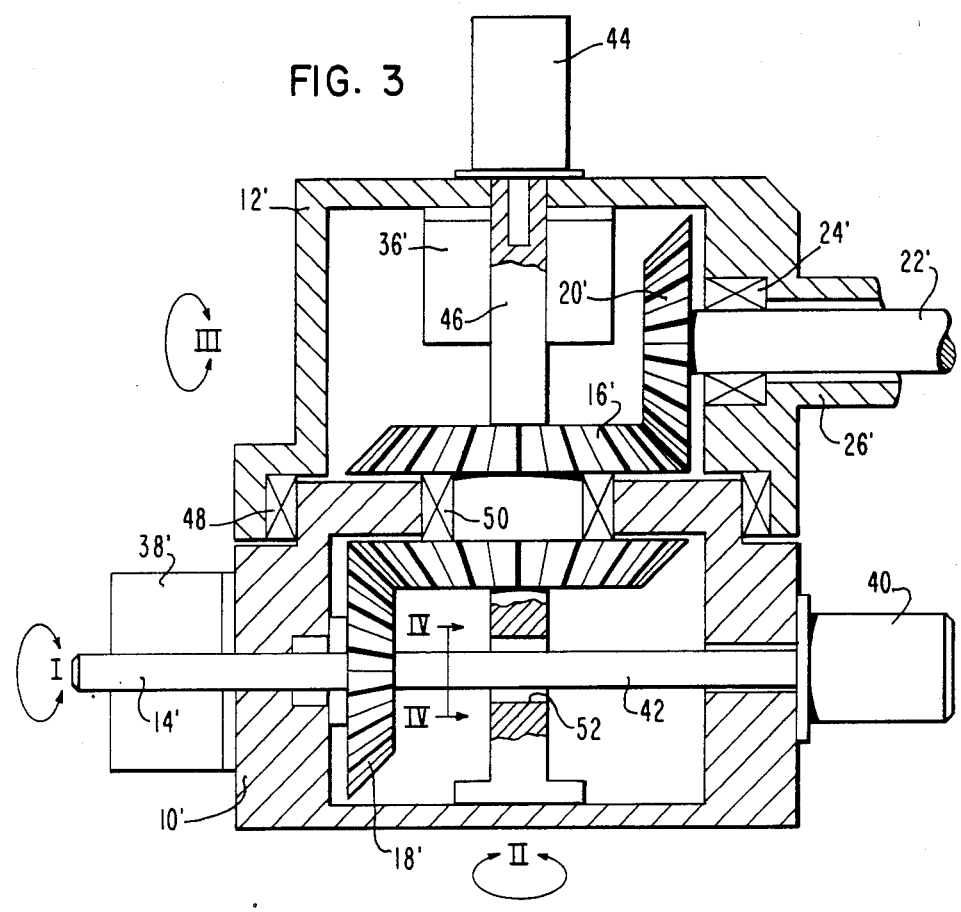
FIG. 3 is a view, mostly in section, of a wrist of another form adapted to carry out the invention.
Figure 4:
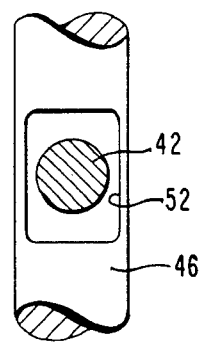
FIG. 4 is a view corresponding to one taken along the line IV—IV.

An embodiment of the invention in another form is shown in FIG. 3 in which those parts which perform the same functions as equivalent parts in FIGS. 1 and 2, are given the identical numeral with an added prime. Other elements considered worthy of note and identification include the resolver 40 connected to shaft 42 upon which the end effector gear 18' is affixed, resolver 44 attached to shaft 46 which has its opposite end affixed to the one part 10' of the wrist for rotation therewith. Bearing means 48 is installed between the two facing, relatively movable parts of the wrist. The first gear means 16' in the FIG. 3 embodiment takes the form of a pair of oppositely directed, but attached, bevel gears, and this combination is mounted for rotation relative to both parts of the wrist on bearings 50. To accommodate the intersection of the two shafts 42 and 46, an opening 52 of greater dimension in both directions than the diameter of the shaft 42 is provided to permit passage of the one shaft through the other.

The brakes 36' and 38', each of which is secured to its respective part of the wrist and in encompassing relation to the respective shaft, are of the type which are capable of engaging the shaft to prevent rotation thereof or disengaging the shaft to permit rotation of the shaft relative to the brake. These devices are commercially available from the Electroid Corporation, Springfield, N.J., under the designation ECA-26C.

The functioning of the embodiment in FIG. 3 is essentially the same as that of the schematic embodiment in FIGS. 1 and 2. With brake 36' engaged, rotation of shaft 46 is prevented and accordingly, rotation of part 10' of the wrist relative to the other part 12' of the wrist. With brake 38' disengaged, rotation of the gear 20' causes rotation of gear 16' and accordingly rotation of gear 18' so that the end effector shaft is rotated, while the two parts 10' and 12' of the wrist are prevented from rotating relative to each other. Alternatively, with brake 38' engaged and brake 36' disengaged, rotation of gear 20' causes rotation of gear 16' but rotation of gear 18' is prevented by the brake and, accordingly, the one part 10 of the wrist rotates relative to part 12' of the wrist.

It will be noted that one difference resulting from the form of the embodiment in FIG. 3, as contrasted to that of FIGS. 1 and 2, is that 360° rotation of the one part 10' relative to the other part 12' of the wrist is possible. Also in the FIG. 3 representation the resolvers 40 and 44 are conveniently accommodated.

We claim:

1. In a robotic manipulator wrist of the type in which one part of the wrist carries an end effector shaft rotatable about the end effector axis, and said one part of said wrist is rotatable relative to an other part of said wrist about another axis, the improvement comprising:
   first gear means in said wrist and disposed with its axis of rotation coincident with said another axis, said first gear means being mounted in rotatable relation to said one part of said wrist;
   second gear means in said wrist and affixed for rotation with said end effector shaft and in meshing relation with said first gear means;
   third gear means in said wrist and in meshing relation with said first gear means and driven from a remote source;
   engageable and disengageable brake means carried by said wrist and having one condition preventing relative movement between said second gear means and said first gear means while permitting relative rotation between said one part and said other part of said wrist, whereby rotation of said third gear means effects rotation of said one part relative to said other part of said wrist without rotation of said end effector shaft about its axis, and another condition preventing relative rotation between said one part and said other part of said wrist while permitting relative movement between said second gear means and said first gear means whereby rotation of said third gear means effects rotation of said end effector shaft about its axis without relative movement of said one part relative to said other part of said wrist; and
   said first, second and third gear means comprising the totality of gear means in said wrist for effecting both rotation of said end effector about its axis and rotation of said one part relative to said other part.

2. In a wrist according to claim 1, including: means for rotating said wrist as a whole about a third axis.

3. In a wrist according to claim 1, wherein: said another axis is at a right angle to said end effector axis.

4. In a wrist according to claim 2, wherein: said third axis is at a right angle to said another axis.

5. In a robotic manipulator wrist in which one part of the wrist carries an end effector translationally fixed relative thereto and rotatable about the end effector axis, and said one part of said wrist is rotatable relative to an other part of said wrist about another axis, the improvement comprising:
   gear train means in said wrist for effecting selectively rotation of said one part relative to said other part of said wrist, and alternatively rotation of said end effector about its axis, said gear train means comprising a driving gear means in mesh with an intermediate gear means mounted in rotatable relation to said one part of said wrist and in mesh with end effector gear means;
   brake means carried by said wrist for preventing relative movement between said one part and said other part of said wrist to obtain end effector rotation alone through said driving gear means operation, and for preventing relative movement between said intermediate gear means and said end effector gear means to obtain movement of said one part of said wrist relative to said other part only through said driving gear means operation; and
   said gear train means comprising the totality of gear means in said wrist for effecting both rotation of said end effector about its axis and rotation of said one part relative to said other part.

6. In a wrist according to claim 5, including: means for rotating said wrist as a whole about a third axis.

7. In a wrist according to claim 5, including: first shaft means extending along said end effector axis in said one part and having said end effector gear means affixed thereto; and said shaft means has resolver means attached thereto.

8. In a wrist according to claim 7, including: second shaft means transversely disposed to said first shaft means and having its axis coincident with the axis of said intermediate gear means; said second shaft means having one end portion fixed to said one part of said wrist, and its opposite end portion journaled in rotatable relation to said other part of said wrist; and said second shaft means has resolver means attached thereto.

9. In a wrist according to claim 8, wherein: said brake means includes one brake fixed to said first part of said wrist and selectively engageable with said first shaft to prevent its rotation, and a second brake fixed to said other part of said wrist and selectively engageable with said second shaft means to prevent is rotation.

* * * * *